United States Patent
Kiezebrink (10) Patent No.: US 10,770,952 B2
(45) Date of Patent: Sep. 8, 2020

(54) DEVICE FOR CONVERTING KINETIC ENERGY OF A FLOWING MEDIUM TO ELECTRICAL ENERGY

(71) Applicant: Ventus Nautilus Holding B.V., Rotterdam (NL)

(72) Inventor: Popke Lammert Sjoerd Kiezebrink, Ermelo (NL)

(73) Assignee: VENTUS NAUTILUS HOLDING B.V., Harderwijk (NL)

( * ) Notice: Subject to any disclaimer, the term of this patent is extended or adjusted under 35 U.S.C. 154(b) by 0 days.

(21) Appl. No.: 15/315,250

(22) PCT Filed: Jun. 10, 2015

(86) PCT No.: PCT/NL2015/050423
§ 371 (c)(1),
(2) Date: Nov. 30, 2016

(87) PCT Pub. No.: WO2015/190923
PCT Pub. Date: Dec. 17, 2015

(65) Prior Publication Data
US 2017/0201157 A1    Jul. 13, 2017

(30) Foreign Application Priority Data

Jun. 10, 2014    (WO) ............... PCT/NL2014/050372

(51) Int. Cl.
*H02K 7/18*        (2006.01)
*F03B 17/06*    (2006.01)
*F03D 1/06*     (2006.01)

(52) U.S. Cl.
CPC ......... *H02K 7/1823* (2013.01); *F03B 17/061* (2013.01); *F03D 1/065* (2013.01);
(Continued)

(58) Field of Classification Search
CPC ..... H02K 7/1823; F03B 17/061; F03D 1/065; F05B 2240/33; Y02E 10/28; Y02E 10/721; Y02E 10/725
(Continued)

(56) References Cited

U.S. PATENT DOCUMENTS 4,095,918 A * 6/1978 Mouton, Jr. ............ F03B 11/02
                                                                          290/54
4,116,581 A * 9/1978 Bolie ........................ F03D 1/04
                                                                          415/4.4
(Continued)

FOREIGN PATENT DOCUMENTS

DE    102004006812 A1    9/2005
GB          213022 A        3/1924

OTHER PUBLICATIONS

International Search Report and Written Opinion dated Aug. 24, 2015 for PCT Application, PCT/NL2015/050423 filed Jun. 10, 2015.

*Primary Examiner* — Charles Reid, Jr.
(74) *Attorney, Agent, or Firm* — Browdy and Neimark, P.L.L.C.

(57) ABSTRACT

A device for converting kinetic energy of a flowing medium to electrical energy includes a rotor for placing in the flowing medium and a generator connected to the rotor. The rotor includes a tube with one or more vanes mounted on the inner side of the tube and extending radially to the centre thereof, wherein the tube is mounted for rotation about a horizontal axis. A length of the tube in horizontal direction amounts here to at least 25% of a diameter of the tube in vertical direction. An outflow part diverging in the flow direction can connect to a rear edge of the tube as seen in flow direction of the medium. The tube can be bearing-mounted in a frame via a central shaft mounted on the inner (Continued)

ends of the vanes. The frame can on the other hand include an outer bearing, for instance a stator tube.

18 Claims, 10 Drawing Sheets

(52) U.S. Cl.
CPC ........... *F05B 2240/33* (2013.01); *Y02E 10/28* (2013.01); *Y02E 10/721* (2013.01); *Y02E 10/725* (2013.01)

(58) Field of Classification Search
USPC ...................................................... 290/55, 44
See application file for complete search history.

(56) References Cited

U.S. PATENT DOCUMENTS

| | | | |
|---|---|---|---|
| 2003/0137149 A1 | 7/2003 | Northrup | |
| 2010/0148515 A1 | 6/2010 | Geddry et al. | |
| 2011/0274533 A1* | 11/2011 | Presz, Jr. | F03D 1/04 415/1 |
| 2012/0034082 A1 | 2/2012 | Stimm | |
| 2013/0336811 A1* | 12/2013 | Muller | F03B 3/126 417/53 |
| 2014/0145447 A1* | 5/2014 | Mieremet | F03D 5/00 290/55 |

* cited by examiner

DEVICE FOR CONVERTING KINETIC ENERGY OF A FLOWING MEDIUM TO ELECTRICAL ENERGY

The invention relates to a device for converting kinetic energy of a flowing medium to electrical energy, comprising a rotor for placing in the flowing medium and a generator connected to the rotor. Such a converting device is known for instance in the form of a wind turbine or a hydroelectric turbine.

As is known, a large number of the energy sources being used at the moment are in principle not inexhaustible. The proven reserves of mineral fuels such as petroleum and natural gas are, if consumption remains the same, at most sufficient for several decades or several hundred years, while given the increasing standard of living of the world population this consumption is more likely to increase rather than decrease. The use of these energy sources moreover results in a number of problems, of which air pollution and warming of the Earth's atmosphere are the best known.

Tireless efforts are therefore being made to find alternatives, and up to now these have been found in the form of nuclear energy and different natural or renewable energy sources such as wind energy, solar energy and the like. These alternative energy sources also still have a large number of drawbacks however. Energy generation by nuclear fission thus results in the release of hazardous radiation and radioactive waste for which no processing method has yet been found, while the technique of nuclear fusion, which is promising in theory, has not yet been found usable in practice.

Of the renewable energy sources wind energy appears in the short term to be the most promising. Wind energy can in principle be produced almost anywhere in the world. The most significant drawback of wind energy is that the speed of the wind just above the ground is limited so that wind turbines at high locations are necessary for an efficient energy generation. Furthermore, the power generated increases with the surface area covered by the blades of a wind turbine, so by the square of the length of the blades, this being an additional reason for opting for large wind turbines. Various factors result in the wind turbines being very conspicuously present in the landscape, thereby limiting their social acceptance. The rotating blades of a wind turbine moreover cause a considerable noise nuisance.

The invention therefore has for its object to provide an improved converting device, wherein these drawbacks do not occur or at least do so to lesser extent. According to the invention this is achieved in a converting device as described above in that the rotor comprises a tube with at least one vane mounted on the inner side of the tube and extending radially to the centre thereof, wherein the tube is mounted for rotation about a substantially horizontal axis and wherein a length of the tube in horizontal direction amounts to at least 25% of a diameter of the tube in vertical direction.

By mounting the vane with its outer end on a tube losses at the position of this outer end, which occur in conventional devices as a result of the creation of tip vortices, are avoided. The efficiency of the converting device is hereby increased, while the noise production is moreover decreased. In addition, an effective construction is in this way obtained. Because the vane is optimally supported by the relatively long tube, it can have a relatively large surface area so that a relatively large amount of power can be generated.

The length of the tube can even amount to at least 30%, preferably at least 40% and more preferably in the order of 45% of the diameter of the tube. The medium is thus guided over a relatively long flow path through the tube, whereby an optimal transfer of energy is possible. An outflow part diverging in the flow direction is preferably connected to a rear edge of the tube as seen in flow direction of the medium. The medium can hereby expand in controlled manner after passing the vanes. This is of course only the case with a compressible medium, so when the converting device is used as wind turbine.

A length of the diverging outflow part in horizontal direction can amount here to between 80% and 120% of the length of the tube, and preferably substantially correspond to the length of the tube.

In order to achieve an optimum expansion, an end diameter of the diverging outflow part in vertical direction can amount to between 115% and 150%, and preferably substantially 130% of the diameter of the tube.

The at least one vane is preferably connected to the tube along a spiral-shaped connecting line. The vane thus has a form having an optimal aerodynamic twist, thereby further improving the efficiency of the device.

For structural reasons it is recommended that the at least one vane has a substantially constant thickness. The vane can in that case be formed from a blank.

When the at least one vane has a chord length which is at least equal to the length dimension of the tube in flow direction of the medium, a part of the vanes can remain clear of the tube if this provides advantages in terms of flow engineering.

The at least one vane can for instance protrude at the front side outside the tube as seen in the flow direction. A uniform inflow is thus obtained into the converting device.

In order to maximize the yield of the device it is further recommended that a plurality of vanes are mounted distributed in peripheral direction on the inner side of the tube. The connecting lines of the individual vanes can together cover substantially the whole inner periphery of the tube so that the largest possible active surface area is created.

When the rotor comprises at least three vanes, a very uniform rotating movement is obtained and the loads on the device are well distributed.

The rotor is preferably configured to operate at a Tip Speed Ratio (TSR) in the order of 0.5-2.0, preferably a TSR in the order of 0.8-1.5 and more preferably a TSR in the order of 1.2.

The TSR is defined here as the ratio of the tangential speed of the tips of the vanes—and so of the tube on which they are mounted—and the undisturbed flow speed of the medium:

$$TSR = \omega R/U,$$

wherein $\omega$ specifies the tangential speed in rad/s, R is the radius of the tube in metres and U is the undisturbed flow speed in m/s.

In order to enable rotation of the tube, it is preferably bearing-mounted in a frame.

The tube can here be bearing-mounted in the frame via a central shaft mounted on the inner ends of the vanes. A central mounting is structurally simple and can be realized at low cost.

It is recommended in this case that the inner end of the at least one vane is mounted along a spiral-shaped connecting line on the central shaft. The part of the or each vane located furthest inward is thus also active in extracting energy from the medium flowing past.

When the spiral-shaped connecting lines along the tube and along the central shaft have substantially the same pitch, a uniform flow is guaranteed over the whole span width of the or each vane.

In respect of stability it is recommended that the central shaft is bearing-mounted at at least two locations in the frame. One of the bearings of the central shaft can be placed here upstream of the vanes and another bearing downstream of the vanes. This can be achieved in structurally simple manner when the bearings are mounted on spacer brackets protruding in front of and behind the rotor. The rotor is then as it were suspended between the bearings.

In the case of bearing-mounting on a central shaft it is further recommended that the generator is operatively connected to the central shaft. A solution which is structurally simple and elegant in terms of flow engineering is realized when the generator is mounted on the central shaft or even integrated therein.

The frame can on the other hand comprise an outer bearing, in particular a stator tube, enclosing the tube. A bearing on the periphery of the tube is robust and, because it is embodied as fixed tube or stator tube, the flow around the converting device is not affected by the rotation of the tube. This also further reduces the noise production.

It is recommended in this respect that a length of the stator tube is greater in the flow direction of the medium than that of the rotating tube.

In order to enable expansion of the gaseous medium—in the case of use as wind turbine—after it leaves the rotor, the stator tube preferably has an increasing diameter as seen in flow direction of the medium.

In a specific embodiment of the converting device according to the invention the inner ends of the vanes lie at a distance from each other, so leaving clear a central passage. This central passage is particularly important when the converting device is used in flowing water, since, in the undesirable case that fish are suctioned in, they then have the chance of passing through the device unharmed. The central passage also provides aerodynamic advantages when the converting device is used as wind turbine.

The generator, which must ultimately convert the rotating movement of the rotor to electricity, can be operatively connected to the tube. Because the tube has a relatively large periphery, it can in fact already function as an accelerator so that the generator can be operative in an optimal speed range.

The generator is preferably connected to the tube via a cardan shaft or endless connecting member, in particular a belt or chain, co-acting with the periphery of the tube. The generator can thus be placed at a distance from the tube. Irrespective of the nature of the medium flowing past, this placing has advantages in respect of flow engineering, while in addition, in the case the rotor is placed in the water, the generator can be held clear of the water.

In order to always enable optimal orientation of the converting device toward the flowing medium, the tube is preferably further mounted for pivoting about a substantially vertical axis. This can be achieved in structurally simple manner when the frame carrying the tube is pivotally mounted on an upright.

The invention is now elucidated on the basis of a number of embodiments, wherein reference is made to the accompanying drawing, in which corresponding components are designated with the same reference numerals, and in which.

Figure 1:
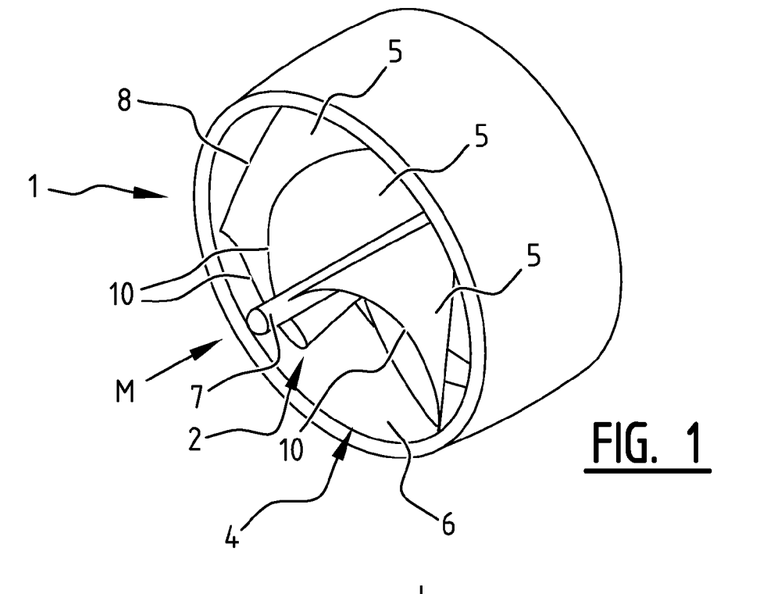
FIG. 1 is a prospective front view of a first embodiment of a converting device according to the invention.
Figure 2:
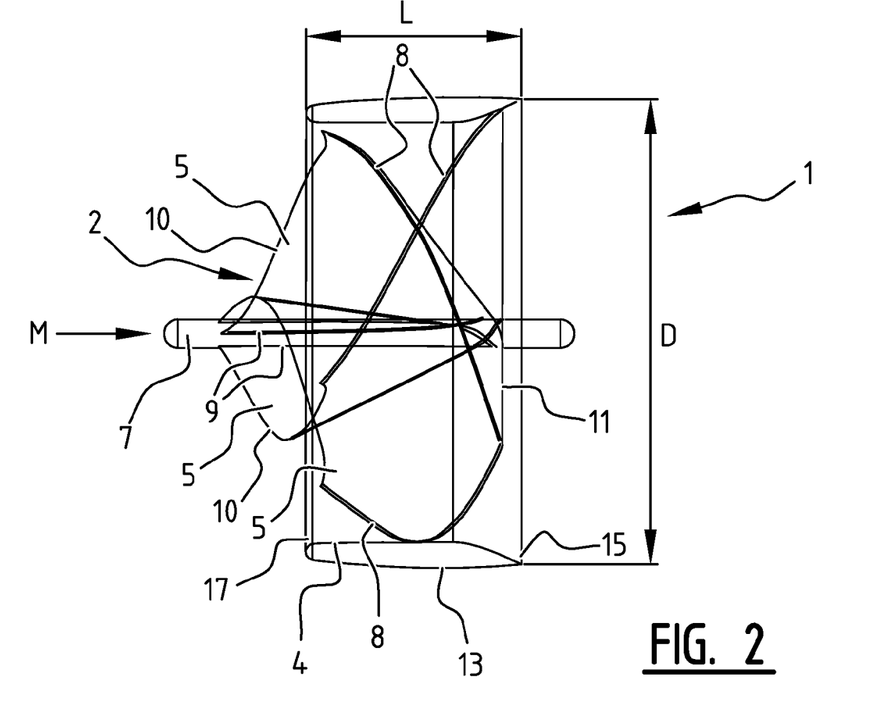
FIG. 2 is a side view of the converting device of FIG. 1.
Figure 3:
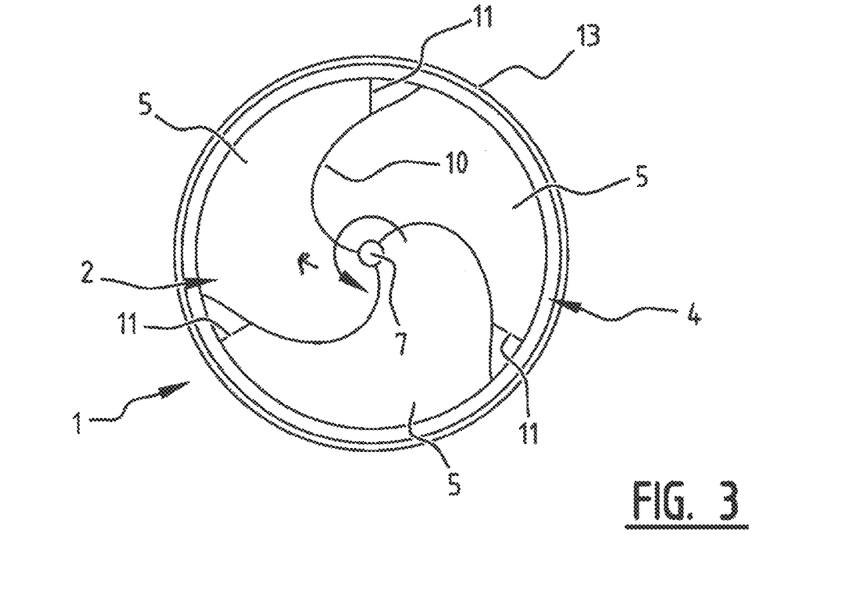
FIG. 3 is a front view of the converting device of FIGS. 1 and 2.

A device 1 for converting kinetic energy of a flowing medium M, for instance wind or water, to electrical energy comprises a rotor 2 for placing in the flowing medium M and a generator 3 connected to the rotor (FIG. 1). Rotor 2 is formed by a tube 4 in which one or more vanes 5 are arranged. In the shown embodiment there are three blades 5, which are mounted in uniform distribution in peripheral direction on the inner side 6 of the tube. Each vane 5 extends radially from tube 4 to the centre of the tube and in the shown embodiment is there mounted on a central shaft 7. Different techniques can be envisaged for the mounting of vanes 5 on tube 4 and on central shaft 7, this also depending on the materials used. The vanes 5 can thus be glued or welded or be mounted by means of fixing elements. It is even possible to envisage the vanes 5 being formed integrally with either tube 4 or central shaft 7. Both (light) metal and (fibre-reinforced) plastics are suitable as material for vanes 5, tube 4 and central shaft 7. Owing to the mounting of vanes 5 on tube 4 tip losses are avoided.

For optimal guiding of the flow and a maximum energy transfer between the flowing medium M and vanes 5 the tube 4 has a relatively great length. In the shown embodiment the ratio of the length L and the diameter D of tube 4 is about 0.45.

Each vane 5 is mounted on tube 4 along a connecting line 8 which in the shown embodiment runs in a spiral shape. In addition, each vane 5 is mounted in this embodiment on central shaft 7 along a connecting line 9, which in the shown embodiment starts substantially parallel to the flow direction but takes on a spiral shape close to the outflow side. In the shown embodiment the connecting line 8 of vane 5 to tube 4 covers roughly a third of a full revolution along the periphery of tube 4. Connecting line 8 could also be shorter or, conversely, longer. The last part of connecting line 9 is ultimately so strongly curved that it also covers a revolution. The pitch of the inner and outer connecting lines 8, 9 is thus substantially equal. Each vane 5 has in the shown embodiment a substantially constant thickness over its whole surface. Because of this and because of the path of connecting lines 8, 9 it is possible to form the vane 5 from a blank.

In the shown embodiment the chord length of each vane 5, so the distance between its forward edge 10 and its rear edge 11, is at least equal to the dimensions of tube 4 in the flow direction of the medium M. The chord length of vanes 5 is even slightly greater than the length of tube 4 so that vanes 5 protrude here with their forward edges 10 in front of the tube. The same applies for central shaft 7. An optimal free approach flow to vanes 5 is hereby obtained before the medium M is forced through tube 4.

In the shown embodiment tube 4 is mounted for rotation in the direction of the arrow R in a frame 12 which comprises a stator tube 13 enclosing the rotating tube 4. Rotating tube 4 and stator tube 13 are formed such that they together define an aerodynamically optimal flow channel for the medium M. Inner side 6 of tube 4 and inner side 14 of stator tube 13 have for this purpose a contour widening or diverging at the rear as seen in flow direction. In this shown embodiment the external contour of stator tube 13 is substantially cylindrical with a slightly convex form in flow direction. The size of vanes 5 is such that the three vanes, as seen in front view, fill substantially the whole cross-section of tube 4. This fill ratio is much higher than for a conventional rotor with slender rotor blades.

In an alternative embodiment of converting device 1 (FIG. 4) the stator tube 13 is widened not only internally but also externally on its rear edge. Because of this widening the flow can expand without great losses after leaving rotor 2, while it is decelerated to a speed which lies closer to the free flow speed $U_\infty$. The outer flow can also be deflected by the external widening so that it matches the flow direction of the inner flow, and can thus flow together with the inner flow without great losses. Also shown in this figure is how central shaft 7 which carries vanes 5 is bearing-mounted in spacer brackets 16 extending upstream of inflow opening 17 of device 1. In the shown embodiment there are three spacer brackets 16, whereby a stable mounting is obtained which has a minimum effect on the approach flow to rotor 2. The inflow opening 17 also has a more emphatically aerodynamic form in this embodiment than in the first embodiment. This inflow opening 17 defines a section narrowing or converging in flow direction, whereby the inflowing medium M is accelerated. Owing to the more pronounced form of inflow opening 17 and outflow opening 15 a relatively large space is defined between tube 4 and stator tube 13, in which space for instance bearings can be received for the purpose of supporting the rotation movement of rotor 2. Recommended in practice however is a bearing of central shaft 7 at its front and rear outer ends 18, 19, since fewer components are required for this purpose than for a bearing of tube 4 along its periphery.

Figure 4:
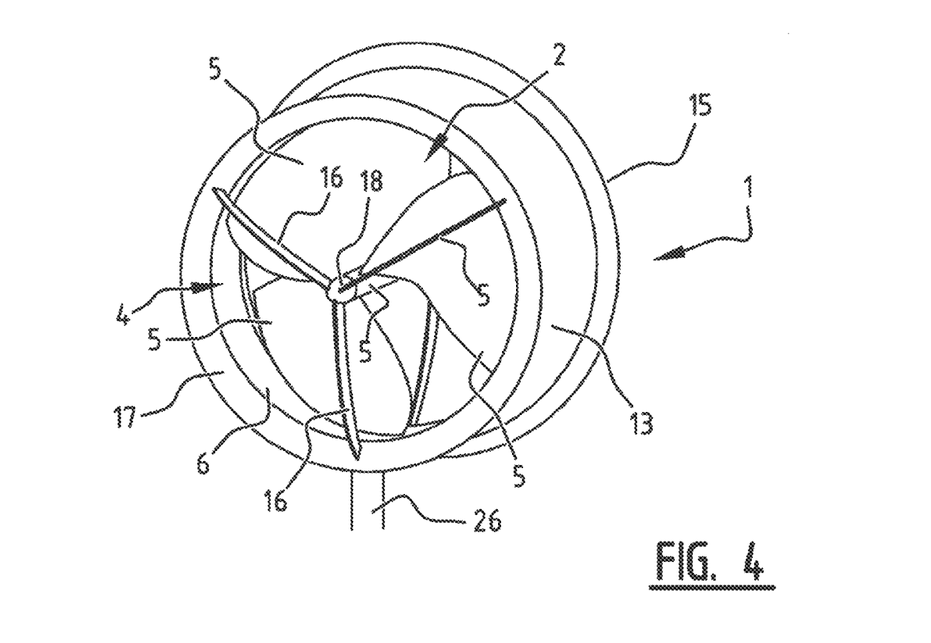
FIG. 4 is a perspective front view of a second embodiment of the converting device according to the invention.
Figure 5:
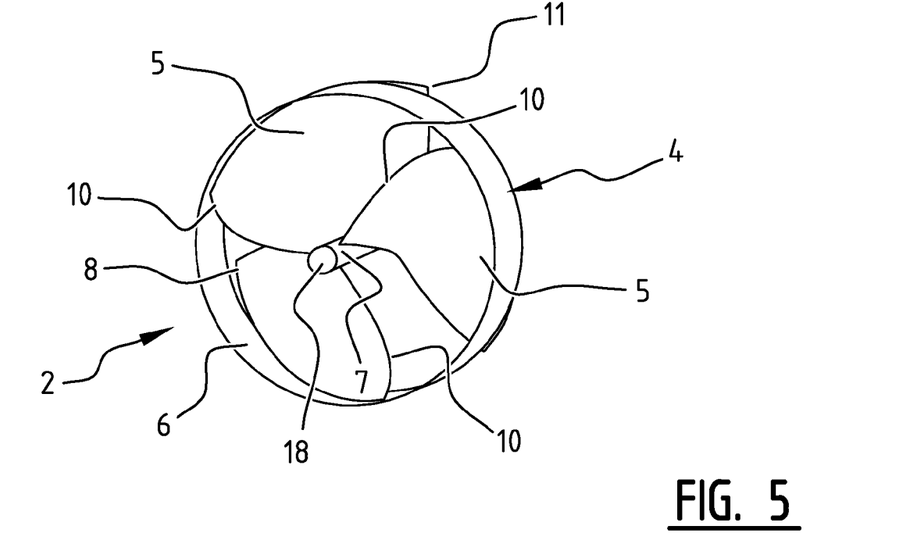
FIG. 5 is a perspective view of a rotor for application in the converting device of FIG. 4.
Figure 6:
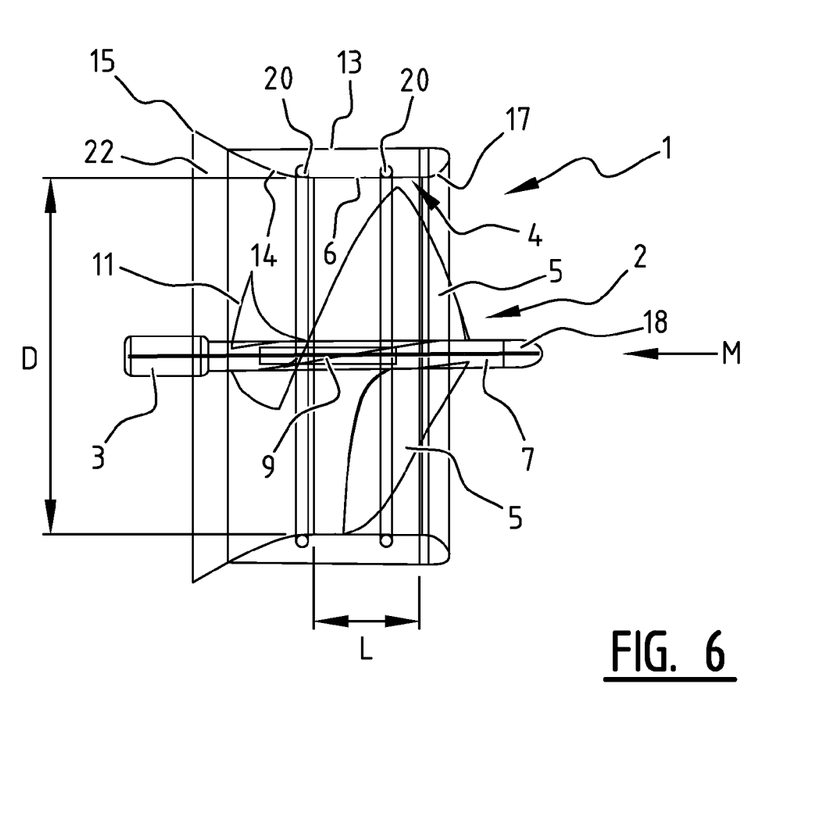
FIG. 6 shows a section along the line VI-VI in FIG. 7.
Figure 7:
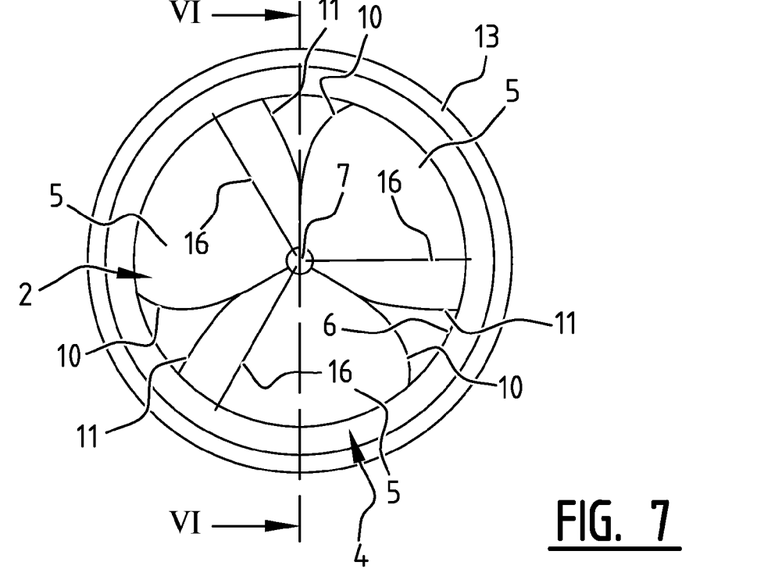
FIG. 7 is a front view of the converting device of FIGS. 4-6.
Figure 8:
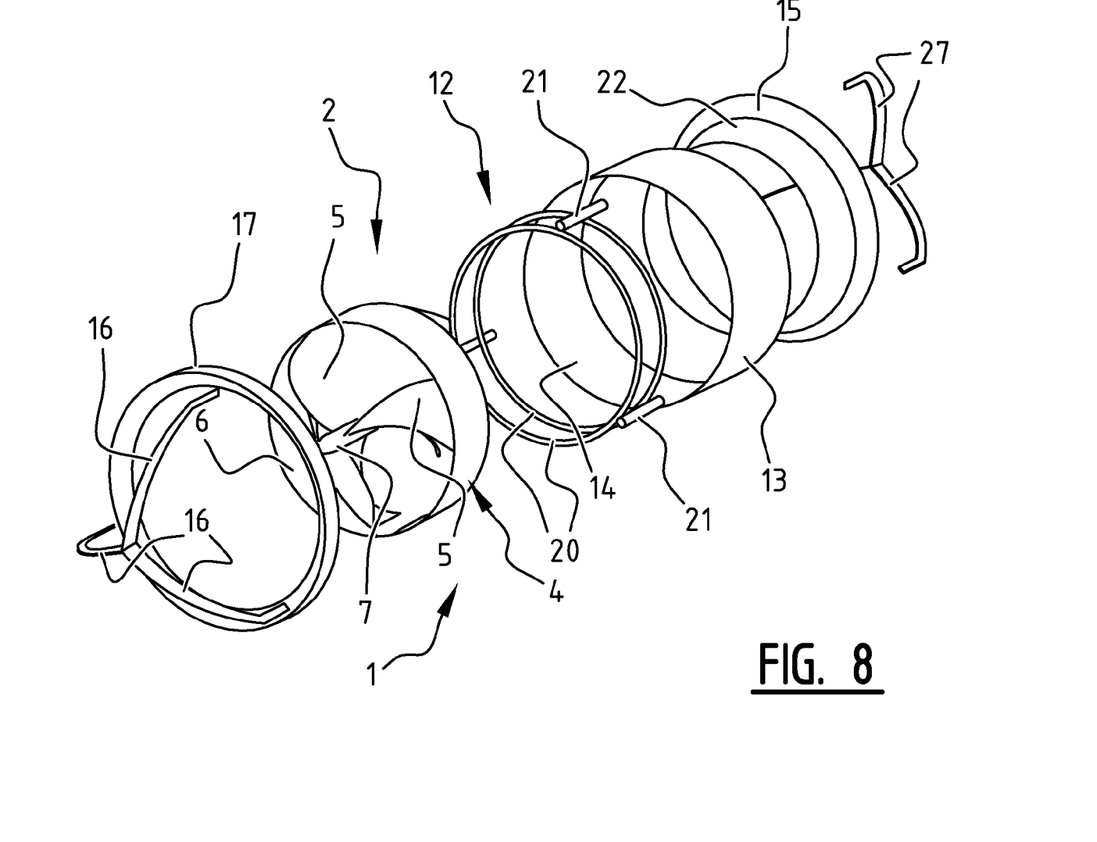
FIG. 8 is a perspective view with exploded parts of the converting device of FIGS. 4-7.
Figure 9:
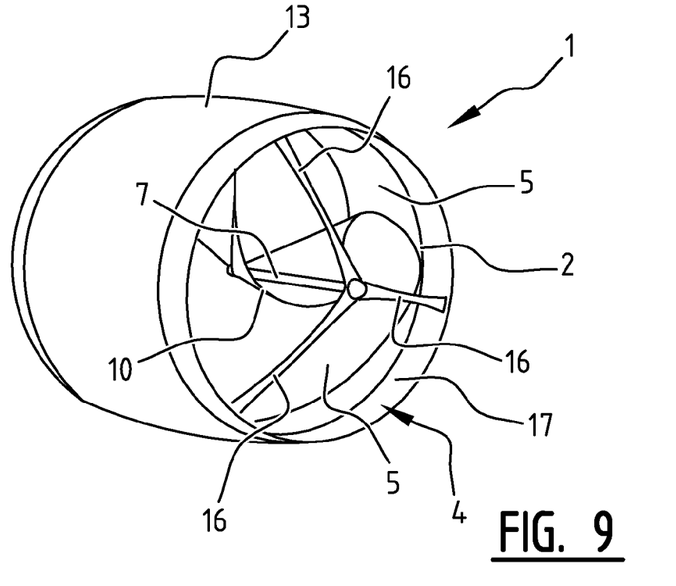
FIG. 9 is a perspective front view from another angle of yet another embodiment of the converting device according to the invention.

Frame 12 is formed here by two tubes 20 which are connected by three longitudinal rods 21. These longitudinal rods 21 collect the front and rear spacer brackets 16, 27 to each other. Stator tube 13, diverging outflow part 22 and converging inflow edge 23 are mounted on the outer side of frame 12.

In order to limit the weight, and thereby the moment of inertia, of rotor 2 as much as possible the tube 4 takes a relatively short form in this embodiment. The length L amounts here to about 30% of the tube diameter D. Vanes 5 protrude not only on the front side but also on the rear side outside tube 4. An optimal balance is hereby obtained between preventing vortices which would occur at the outer tips of vanes 5 on the one hand and giving the rotating parts the lightest possible form on the other.

Further shown in this embodiment is how generator 3 is mounted on the downstream end of central shaft 7. The rotation movement of rotor 2 with central shaft 7 is thus converted directly into a movement of the rotor part of generator 3 along the stator thereof, whereby electricity is generated. In the shown embodiment this electricity is carried outside device 1 by wires accommodated in an upright 26 of converting device 1. The cabling can for instance be fed back via one of the spacer brackets 27 into frame 12 of converting device 1 which is connected to upright 26. The connection between frame 12 and upright 26 is also pivotable about a vertical axis. Frame 12 with rotor 2 therein can in this way be pivoted such that the approach flow of the medium M to rotor 2 is always optimal. When the flow direction of medium M is changed, frame 12 can be easily pivoted on upright 26 to another position in which central shaft 7 is again substantially parallel to the flow direction.

Figure 10:
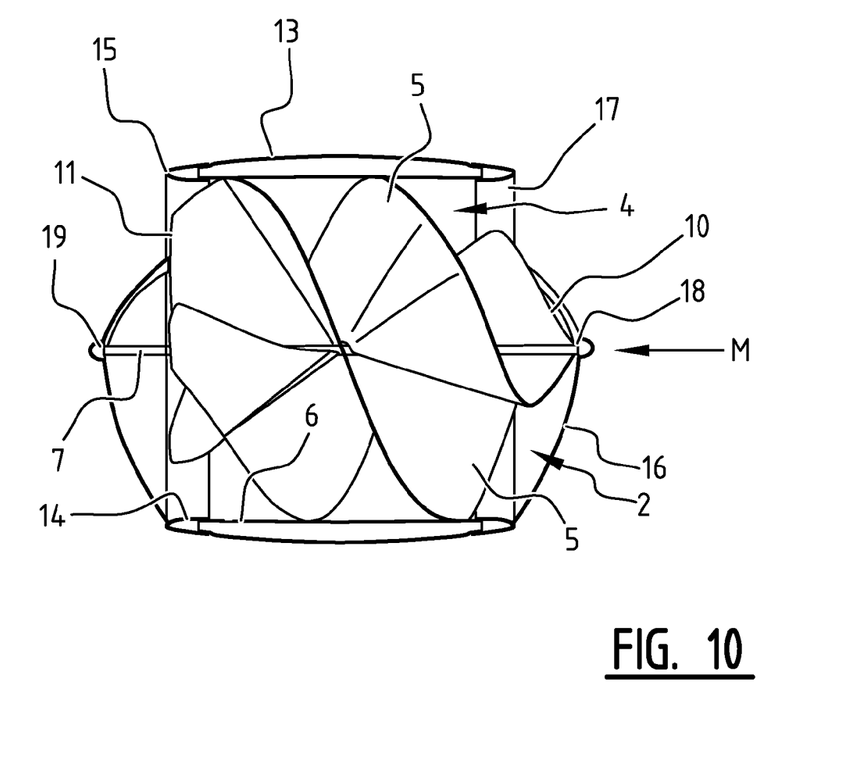
FIG. 10 is a partly cross-sectional side view of the converting device of FIG. 9.
Figure 11:
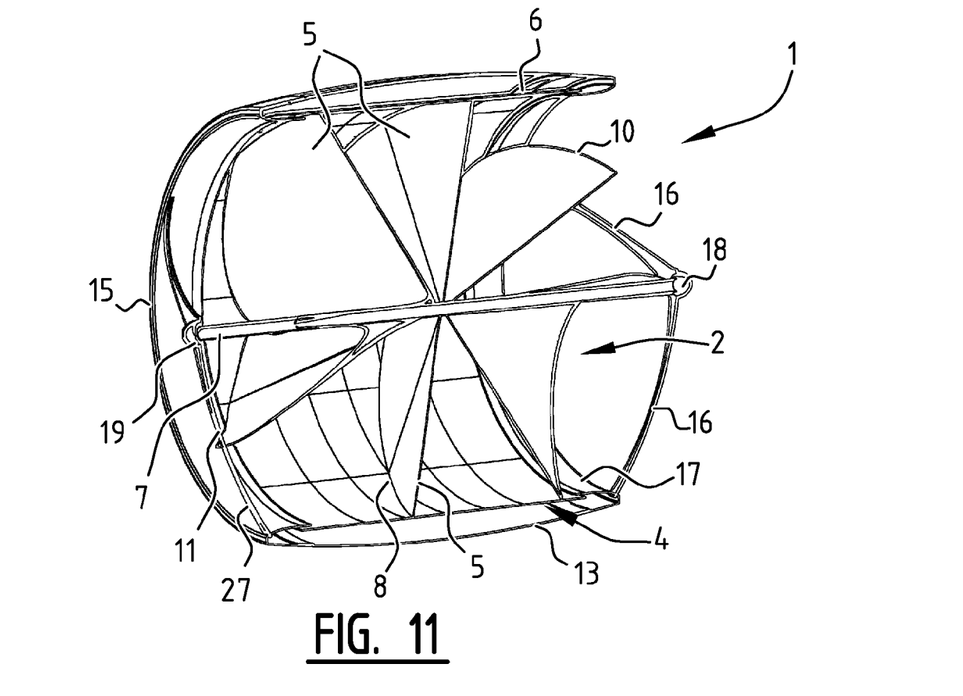
FIG. 11 is a partly cross-sectional perspective rear view of the converting device of FIGS. 9 and 10.

In the two embodiments shown up to this point each vane 5 is trained over roughly a third of the periphery of central shaft 7. When device 1 is intended for the purpose of generating greater amounts of power, it may however also be worthwhile to have each vane 5 meander over a greater part of the periphery around shaft 7. This is shown in FIG. 10 and further, where each vane 5 covers roughly half a revolution in tube 4. The form of stator tube 13 corresponds in this embodiment to that in the first embodiment. The length L of tube 4 amounts in these embodiments to about 80% of its diameter D.

Figure 12:
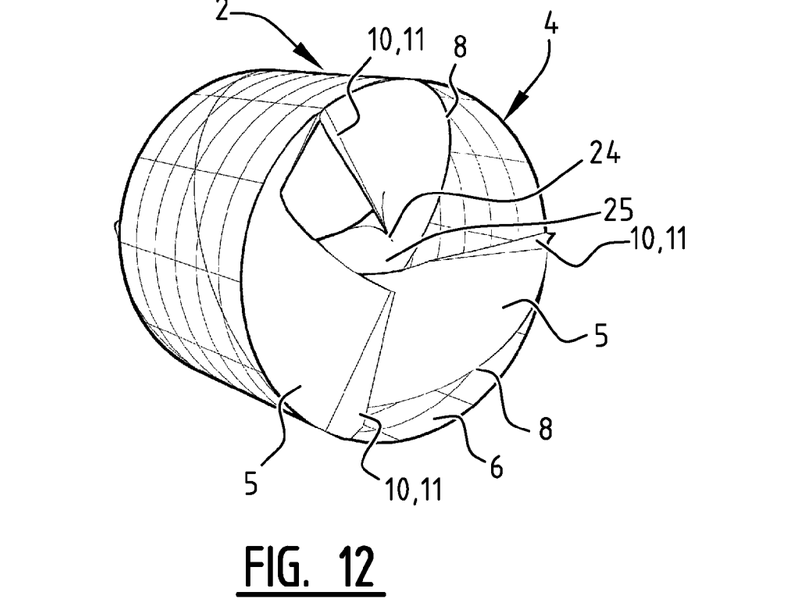
FIG. 12 is a perspective view of a rotor for application in another embodiment of the converting device according to the invention.
Figure 13:
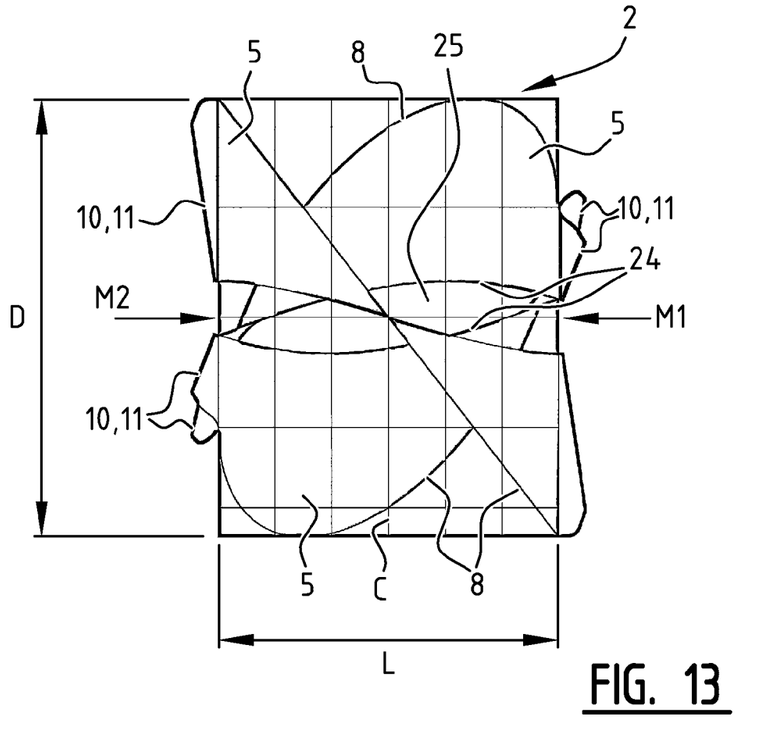
FIG. 13 is a grid-form side view of the rotor of FIG. 12.
Figure 14:
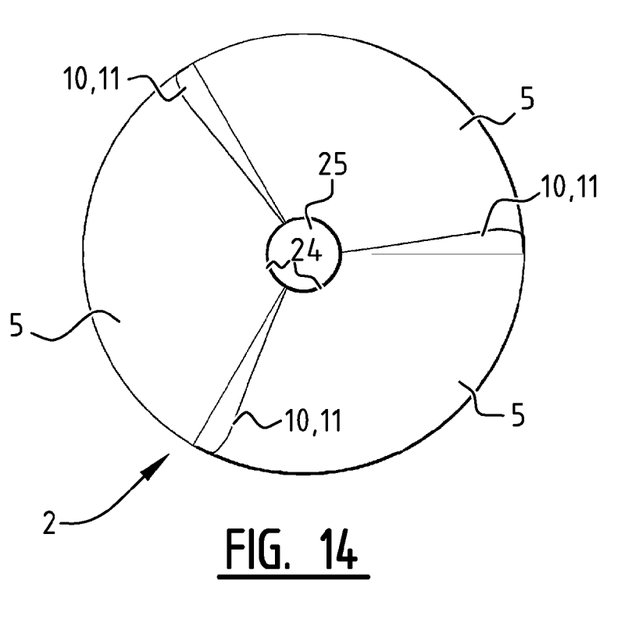
FIG. 14 is a front view of the rotor of FIGS. 12 and 13.

Although in the embodiments shown up to this point the vanes 5 are mounted with their inner outer ends on central shaft 7, it is also possible to have the inner outer ends 24 of vanes 5 end at a distance from each other, whereby a central passage 25 is formed in rotor 2 (FIG. 12). This is particularly important when converting device 1 is used in the water, where the central passage 25 can serve to allow passage of fish, but also has advantages of flow engineering irrespective of the medium in which the converting device is used. In addition, rotor 2 is symmetrical relative to a central plane C in this embodiment. Device 1 can hereby operate in two opposite directions. This is important for instance when device 1 forms part of a tidal power unit, wherein the direction of flow of the water reverses a number of times a day from M1 to M2 and vice versa.

Although in the embodiments shown up to this point the tube 4 has been received rotatingly in each case in a stator tube 13, in a currently recommended embodiment (FIG. 15) rotating tube 4 is bearing-mounted in a U-shaped lower frame 12. This frame 12 consists of two curved front spacers 16, a central box construction 28 and two curved rear spacers 27. Central box construction 28 has on its underside a flange 29 with which converting device 1 can be mounted on an upright (not shown here). As stated, converting device 1 can then swivel as a whole about a vertical axis V so that rotor 2 can be oriented under all conditions in the flow direction of the medium M. The curved spacers 16 come together on the front side as seen in the flow direction of the medium M in a nose piece 30 which carries a front bearing 33 for central shaft 7. At the rear the curved spacers 27 are connected by a plate 31 on which is mounted generator 3 which also carries the rear bearing 34 for central shaft 7. Because generator 3 lies fully in the flow leaving vanes 5 of rotor 2, it is optimally cooled. This is because the flow is very homogenous as it leaves rotor 2 as a result of the presence of tube 4. Such an air cooling of generator 3 could not be realized without the presence of tube 4.

Figure 15:
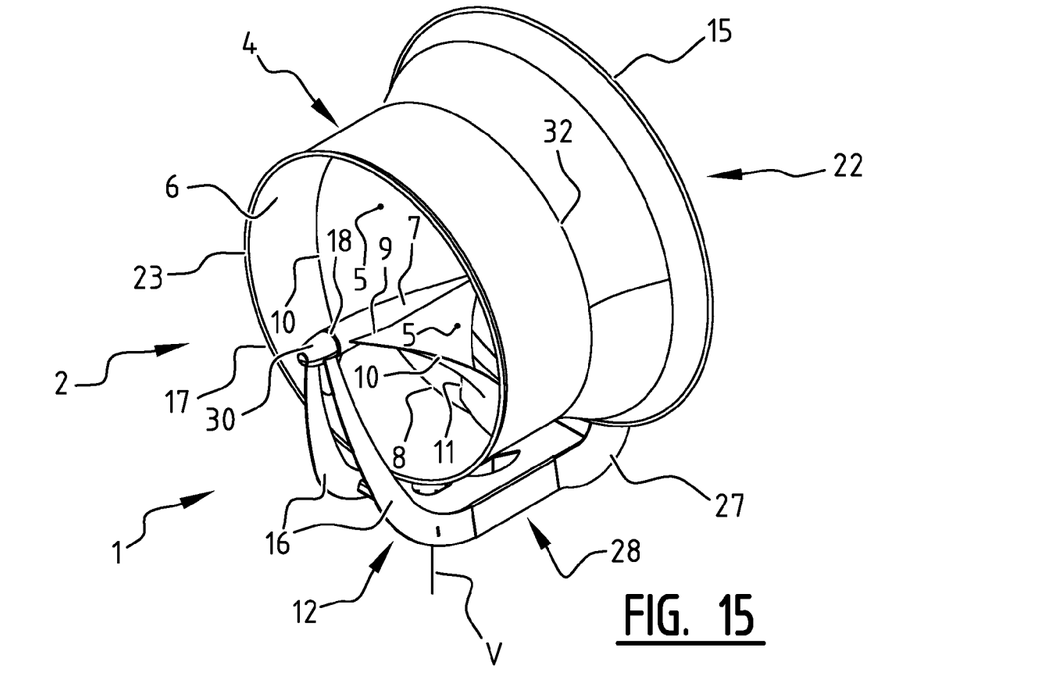
FIG. 15 is a perspective front view of a converting device according to a preferred embodiment of the invention.
Figure 16:
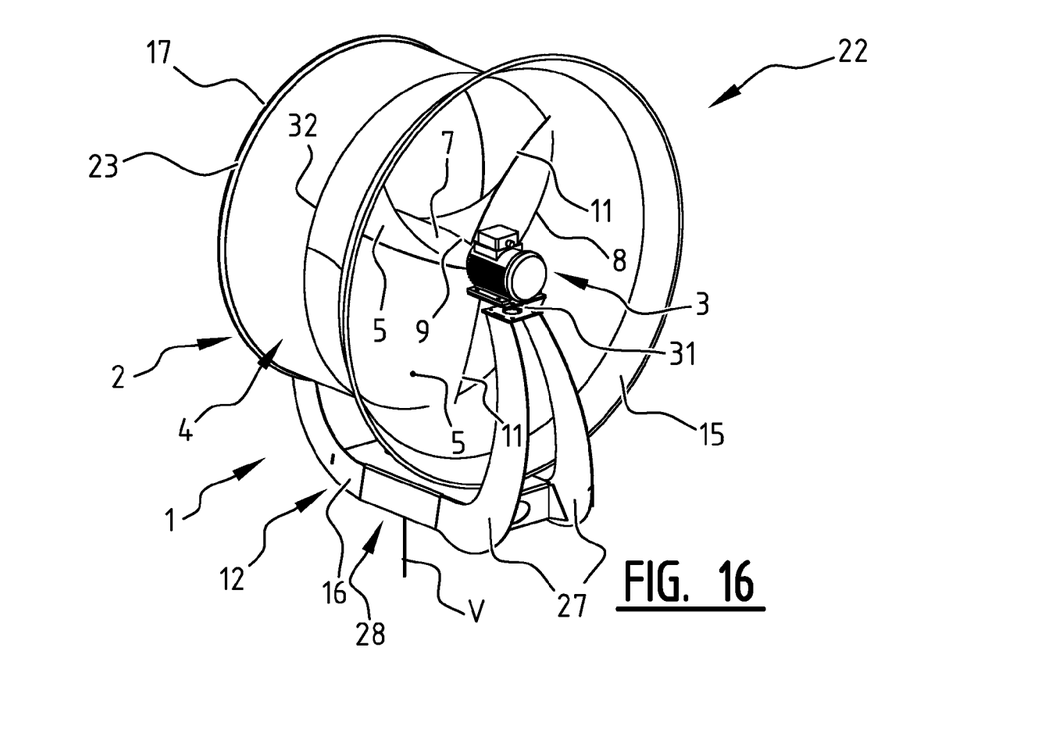
FIG. 16 is a perspective rear view of the converting device of FIG. 15.
Figure 17:
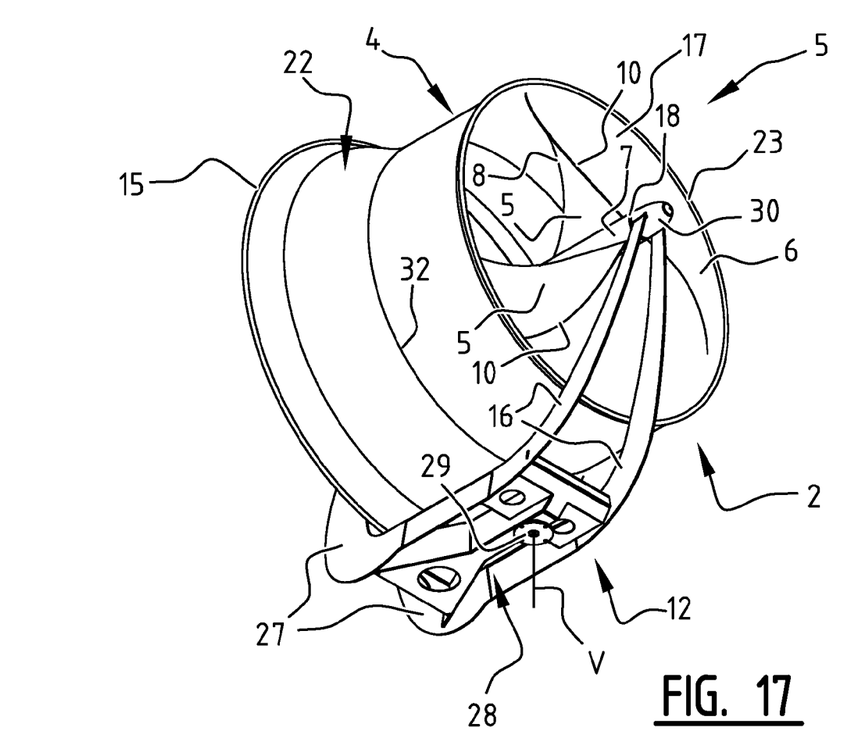
FIG. 17 is a perspective bottom view of the converting device of FIGS. 15 and 16.
Figure 18:
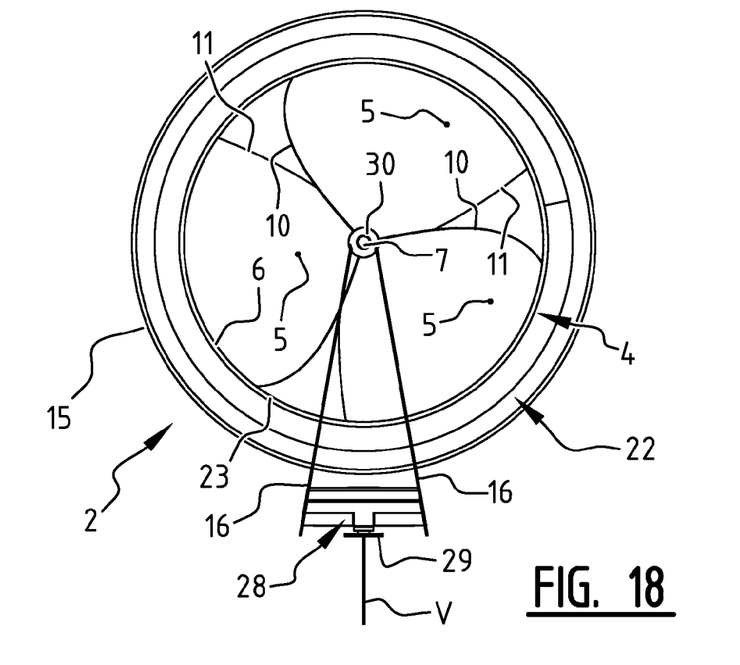
FIG. 18 is a front view of the converting device of FIGS. 15-17.
Figure 19:
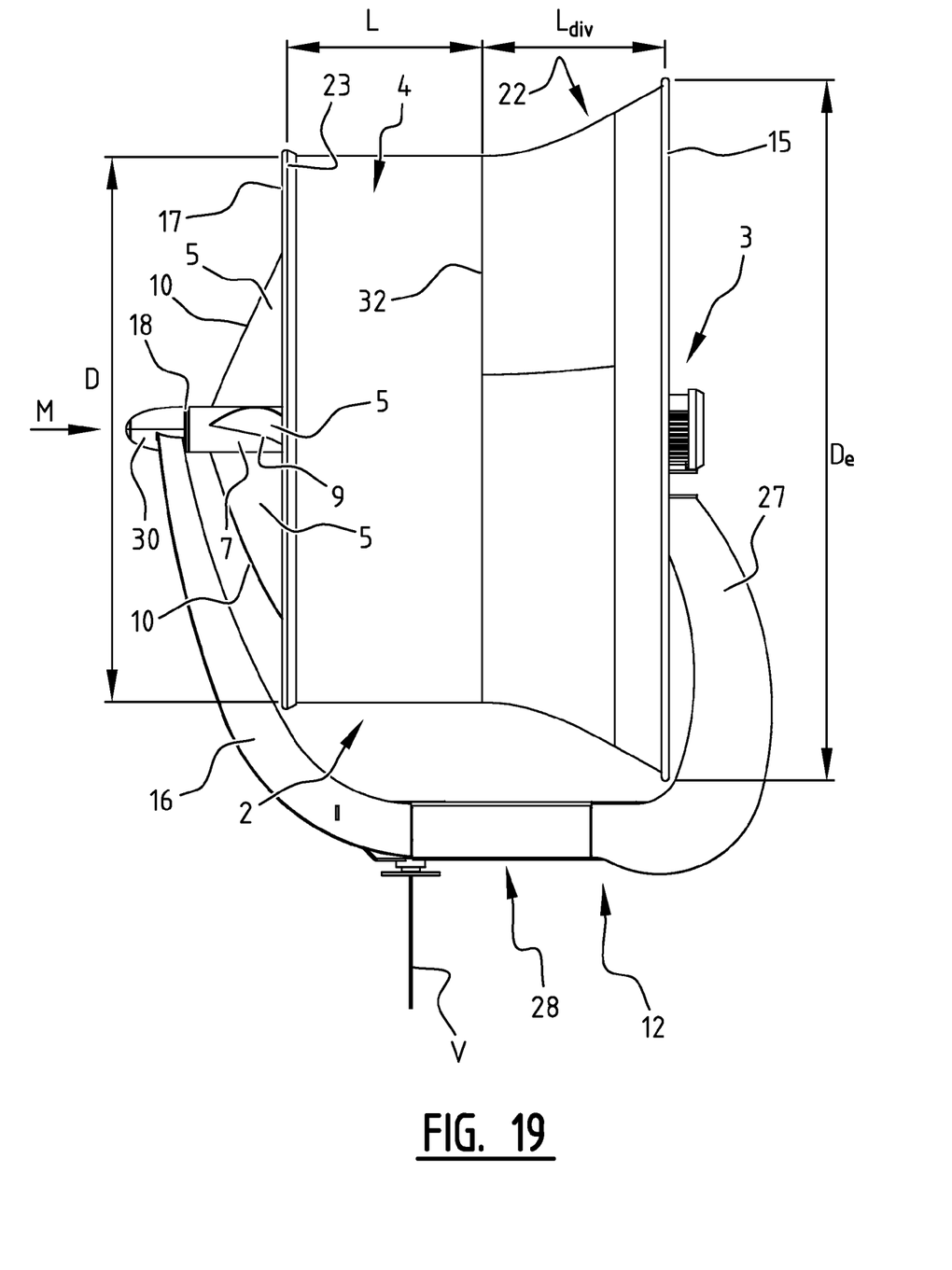
FIG. 19 is a side view of the converting device of FIGS. 15-18.

Because a stator tube is not present in this embodiment, guiding of the air takes place only with the rotating tube 4. This is provided for this purpose with an inflow edge 23 which is widened to some extent, while a diverging outflow part 22 further connects to the rear edge 32 of tube 4 as seen in flow direction. This diverging outflow part 22, which thus co-rotates with tube 4, has a length $L_{div}$ roughly corresponding to that of tube 4 and has a diameter which increases gradually as seen in the flow direction to an end diameter $D_e$. This end diameter $D_e$ amounts in the shown embodiment to about 130% of the diameter D of tube 4, whereby the throughflow area is therefore about 70% greater than that of tube 4.

Although in the embodiments shown above according to FIGS. 4-7 and FIGS. 15-19 the generator 3 was mounted on central shaft 7, it is also possible to envisage power being drawn off from tube 4. This is particularly the case when tube 4 is bearing-mounted at its periphery, for instance in a stator tube 13. This power draw-off is possible directly, for instance by providing tube 4 with magnets and arranging coils in the surrounding frame 12, or vice versa. It is however also possible to have a belt, chain or toothed wheel run along the periphery of tube 4, whereby as a result of the relatively large periphery of tube 4—compared to that of shaft 7—the rotary movement is transmitted directly with a certain acceleration to the generator. This is advantageous because most generators reach their optimum efficiency at a higher rotation speed than the average wind turbine or water turbine can reach. Tube 4 which connects the outer ends of vanes 5 to each other is thus used as a transmission.

Although as a result of the structure with tube 4 which mutually connects the outer ends of vanes 5 rotor 2 has under practically all conditions a higher efficiency than a conventional rotor, there are conditions wherein the difference is greater than in other conditions. In the embodiment shown here the rotor is optimized for a Tip Speed Ratio (TSR) in the order of 0.5-2. The optimum for the design of rotor 2 shown here lies at a TSR in the order of 1.2, although rotor 2 also has a high efficiency in a range around this. It can generally be stated that a highly effective operating range of the rotor lies within determined limits around the absolute maximum, so for instance at a TSR of between 0.8 and 1.5. It is therefore important to adapt the rotation speed to the free flow speed of the medium such that rotor 2 always functions in the vicinity of its optimal point of operation. This can be regulated by control electronics.

The advantageous effects of the chosen construction do not depend on the dimensions of the converting device, or hardly so. An embodiment is now envisaged in practice with a diameter ⌀ in the order of 1.5 m and a length in the order of 0.5 m (for the embodiments of FIGS. 1-8), although the design can easily be scaled while retaining all advantages.

The invention thus provides a converting device which is stiffer, more stable, more efficient and quieter than existing devices of this type as a result of the presence of a tube which mutually connects outer tips of the vanes. Surprisingly, the effect of the additional mass resulting from the presence of the tube is found to be more than compensated here by the advantageous effects associated with suppression of the tip losses resulting from vortices at the outer tips of the vanes.

Although the invention has been elucidated above on the basis of a number of embodiments, it will be apparent that it is not limited thereto but can be varied in many ways. The number of vanes selected can thus be larger or smaller than the three vanes shown here. The shape of the vanes, the angle through which each vane meanders round the shaft and the extent to which and the manner in which the vanes protrude outside the tube can be modified. The same applies for the shape of the tube, the shape of the stator tube and the manner of bearing-mounting of the rotor. The tube could for instance be convergent and divergent, whereby a narrowest section or throat could be formed about halfway along this tube. The shape of a possible stator tube would then of course have to be modified.

The scope of the invention is therefore defined solely by the following claims.

The invention claimed is:

1. A wind turbine for converting kinetic energy of wind to electrical energy, comprising:
a u-shaped frame;
a rotor for placing in the wind; and
an electrical generator having a stator and a generator rotor part that is connected to the rotor,
wherein the rotor comprises an outer tube, a central shaft and at least one vane mounted on an inner side of the outer tube and extending to the central shaft and mounted on said central shaft,
wherein the outer tube is mounted on the u-shape frame for rotation about a horizontal axis,
the u-shaped frame comprising a front spacer bracket arranged in front of the rotor, a rear spacer bracket arranged behind the rotor, and a central construction, wherein the front spacer bracket is provided with a bearing supporting a front end of the central shaft of the rotor, and wherein the rear spacer bracket supports the generator, and wherein the generator rotor part is mounted on a rear end of the central shaft so that the rotary motion of the rotor is directly converted into motion of the generator rotor part, and wherein the generator carries a bearing supporting the rear end of the central shaft of the rotor, and wherein the central construction is configured to be mounted on an upright allowing the frame and rotor to swivel about a vertical axis so that the rotor is orientable in flow direction of the wind,
wherein a length of the outer tube in a horizontal direction amounts to at least 25% of a minimum diameter of the outer tube in a vertical direction,
and wherein the generator is operatively connected to the central shaft and is configured for converting a rotating motion of the central shaft to electricity.

2. The wind turbine as claimed in claim 1, wherein the length of the outer tube amounts to at least 40% of the minimum diameter of the outer tube.

3. The wind turbine as claimed in claim 1, wherein an outflow part diverging in the flow direction connects to a rear edge of the outer tube as seen in flow direction of the wind, and a length of the diverging outflow part in the horizontal direction amounts to between 80% and 120% of the length of the outer tube.

4. The wind turbine as claimed in claim 3, wherein an end diameter of the diverging outflow part in a vertical direction amounts to between 115% and 150% of the minimum diameter of the outer tube.

5. The wind turbine as claimed in claim 1, wherein the at least one vane has a constant thickness.

6. The wind turbine as claimed in claim 1, wherein the at least one vane has a chord length which is at least equal to the length of the outer tube.

7. The wind turbine as claimed in claim 6, wherein the at least one vane protrudes at the front side outside the outer tube as seen in the flow direction.

8. The wind turbine as claimed claim 1, comprising a plurality of vanes mounted distributed in a peripheral direction on the inner side of the outer tube.

9. The wind turbine as claimed in claim 8, wherein the plurality of vanes are connected to the outer tube along spiral-shaped connecting lines, the connecting lines of the individual vanes together cover substantially the whole inner periphery of the outer tube.

10. A wind turbine for converting kinetic energy of wind to electrical energy, comprising:
    a u-shaped frame;
    a rotor for placing in the wind; and
    an electrical generator having a stator and a generator rotor part that is connected to the rotor,
    wherein the rotor comprises an outer tube, a central shaft and at least one vane mounted on an inner side of the outer tube and extending to the central shaft and mounted on said central shaft,
    wherein the outer tube is mounted on the u-shape frame for rotation about a horizontal axis,
    the u-shaped frame comprising a front spacer bracket arranged in front of the rotor, a rear spacer bracket arranged behind the rotor, and a central construction, wherein the front spacer bracket is provided with a bearing supporting a front end of the central shaft of the rotor, and wherein the rear spacer bracket is provided with a bearing supporting a rear end of the central shaft of the rotor, and wherein the generator rotor part is mounted on the central shaft so that the rotary motion of the rotor is directly converted into motion of the generator rotor part, and wherein the central construction is configured to be mounted on an upright allowing the frame and rotor to swivel about a vertical axis so that the rotor is orientable in flow direction of the wind,
    wherein a length of the outer tube in a horizontal direction amounts to at least 25% of a minimum diameter of the outer tube in a vertical direction,
    and wherein the generator is operatively connected to the central shaft and is configured for converting a rotating motion of the central shaft to electricity.

11. The wind turbine as claimed in claim 10, wherein the length of the outer tube amounts to at least 40% of the minimum diameter of the outer tube.

12. The wind turbine as claimed in claim 10, wherein an outflow part diverging in the flow direction connects to a rear edge of the outer tube as seen in flow direction of the wind, and a length of the diverging outflow part in the horizontal direction amounts to between 80% and 120% of the length of the outer tube.

13. The wind turbine as claimed in claim 12, wherein an end diameter of the diverging outflow part in a vertical direction amounts to between 115% and 150% of the minimum diameter of the outer tube.

14. The wind turbine as claimed in claim 10, wherein the at least one vane has a constant thickness.

15. The wind turbine as claimed in claim 10, wherein the at least one vane has a chord length which is at least equal to the length of the outer tube.

16. The wind turbine as claimed in claim 15, wherein the at least one vane protrudes at the front side outside the outer tube as seen in the flow direction.

17. The wind turbine as claimed claim 10, comprising a plurality of vanes mounted distributed in a peripheral direction on the inner side of the outer tube.

18. The wind turbine as claimed in claim 17, wherein the plurality of vanes are connected to the outer tube along spiral-shaped connecting lines, the connecting lines of the individual vanes together cover substantially the whole inner periphery of the outer tube.

* * * * *